United States Patent Office 3,255,170
Patented June 7, 1966

---

3,255,170
CATALYST FOR THE POLYMERIZATION OF BUTADIENE 1-3 CONSISTING OF A NICKEL CARBONYL AND AN ACIDIC METAL HALIDE
Clifford W. Childers, Wayne, N.J., assignor to United States Rubber Company, New York, N.Y., a corporation of New Jersey
No Drawing. Filed Jan. 15, 1963, Ser. No. 251,491
20 Claims. (Cl. 260—94.3)

This invention relates to a catalyst for the polymerization of butadiene-1,3, hereinafter sometimes called butadiene, to a high molecular weight polybutadiene in which a major proportion of the monomer units have cis-1,4 structure, or a major proportion of the monomer units have trans-1,4 structure, and to the polymerization of butadiene with such catalyst. The term high molecular weight polybutadiene refers to a polymer having a dilute solution viscosity of at least 0.1 in benzene which would correspond approximately to a number average molecular weight of at least 10,000.

The catalysts of the present invention are the products obtained by the interaction of nickel carbonyl Ni(CO)$_4$ and a Friedel-Crafts catalyst, i.e., an acidic metal halide, e.g., AlCl$_3$, AlBr$_3$, AlI$_3$, HgCl$_2$, HgBr$_2$, HgI$_2$, TiCl$_4$, ZrCl$_4$, GaCl$_3$, BCl$_3$, BF$_3$, BF$_3$O(CH$_2$CH$_3$)$_2$ in the presence of an inert solvent. The present preferred Friedel-Crafts catalysts are AlCl$_3$ and HgCl$_2$. In the catalyst mixture, the mole ratio of nickel carbonyl to acidic metal halide may be in the range of 10:1 to 1:10, although a mole ratio of about 1:1 is preferred. The reaction medium for the formation of the catalyst and for the polymerization is an organic solvent, and the solvent used is of dominant importance in determining the structure of the polybutadiene that is obtained. In a non-polar aromatic or aliphatic solvent, e.g., benzene, xylene, toluene, heptane, hexane, cyclohexane, octane, a polybutadiene will be produced in which a major proportion of the monomer units will have cis-1,4 structure. In a polar solvent, e.g., an alkanol having 1 to 8 carbon atoms or a cycloalkanol having 5 to 8 carbon atoms, e.g., methanol, ethanol, butanol, hexanol, cyclohexanol, octanol, or a mixture of a non-polar solvent as above described with at least 10% by weight of such a polar solvent in the mixture, a polybutadiene will be produced in which a major proportion of the monomer units will have trans-1,4 structure. The weight ratio of butadiene to solvent reaction medium may be in the range of 1:20 to 1:1. The concentration of catalyst (based on the nickel content) in the polymerization reaction mixture, which includes the butadiene and organic solvent reaction medium, may be in the range of 0.01 to 10 grams of nickel per liter, preferably 0.1 to 1 gram of nickel per liter.

In carrying out the polymerization reaction, the butadiene, solvent reaction medium, and catalyst ingredients may be mixed together in any desired order. The temperature of polymerization is not critical and may range from −20° C. to 100° C. The rate of polymerization and the yield of polymer can be substantially increased by adding small amounts of suitable materials to the polymerizing solution. Alkali metal cyanide (NaCN and KCN) increase polymer yield in non-polar solvents and alkali metal iodide (NaI and KI) increase the polymer yield in reaction media containing polar solvents. The catalysts of the present invention differs from previous polybutadiene catalysts in that no metal alkyl is used, and that stereospecific polybutadiene is formed in the presence of a polar solvent.

The following examples illustrate the invention. All parts, percentages and ratios referred to herein, unless otherwise noted, are by weight.

Example 1

This example illustrates the use of a non-polar solvent to form high molecular weight, high cis-1,4 polybutadiene. One-half gram of nickel carbonyl and 0.4 gram of aluminum chloride were mixed under nitrogen in 200 ml. of dried benzene in a soda bottle of approximately 700 ml. capacity. Sixty-two grams of dried liquid butadiene were then added to the bottle and it was capped. It was then placed in a rocker bath maintained at a temperature of 50° C. for 24 hours. After this time, the polymerization mixture was poured into a beaker containing approximately 500 ml. of methanol and 0.5 gram of antioxidant (phenyl-beta-naphthylamine) to precipitate the polymer. About one gram of high molecular weight polybutadiene which had 66% cis-1,4, 30% trans-1,4 and 4% 1,2-structure was separated from the methanol-benzene solution.

Example 2

This example illustrates the use of alkali metal cyanide to increase the conversion of butadiene to high cis-1,4 polybutadiene with nickel carbonyl and aluminum chloride catalyst in a non-polar solvent. One gram of nickel carbonyl and one gram of aluminum chloride and 1.4 grams of KCN were mixed under nitrogen in 200 ml. of dried benzene in a soda bottle of approximately 700 ml. capacity. One hundred grams of dried liquid butadiene were added to the bottle and it was capped. It was then placed in a rocker bath maintained at a temperature of 25° C. for 50 hours. After this time, the solution of the polymer was poured into a beaker containing approximately 500 ml. of methanol and 0.5 gram of antioxidant (phenyl-beta-naphthylamine) to precipitate the polymer. About 30 grams of high molecular weight polybutadiene which had 59% cis-1,4, 37% trans-1,4 and 4% 1,2 structure was separated from the methanol-benzene solution.

Example 3

This polymerization was the same as Example 1 except one gram of nickel carbonyl was used instead of one-half gram, and one gram of mercuric chloride was used instead of 0.4 gram of aluminum chloride. About one gram of high molecular weight polybutadiene which had 65% cis-1,4 29% trans-1,4 and 6% 1,2 structure was obtained.

Example 4

This example illustrates the use of a polar solvent to form high molecular weight, high trans-1,4 polybutadiene. One-half gram of nickel carbonyl was mixed with 0.4 gram of aluminum chloride under nitrogen in 100 ml. of dried benzene and 100 ml. of dried ethanol in a soda bottle of approximately 700 ml. capacity. Sixty-two grams of dried liquid butadiene were added to the bottle and it was capped. It was then placed in a rocker bath maintained at 50° C. for 24 hours. After this time, the benzene-ethanol solvent in which the polymer had precipitated was poured into a beaker containing approximately 500 ml. of methanol and 0.5 gram of antioxidant (phenylbeta-naphthylamine) to wash the polymer. About six grams of high molecular weight polybutadiene which had 94.5% trans-1,4, 3% cis-1,4 and 2.5% 1,2 structure were recovered. When butanol was substituted for the ethanol in this example, substantially the same results were obtained.

*Example 5*

This example illustrates the use of alkali metal iodide to increase the conversion of butadiene to high trans-1,4 polybutadiene with nickel carbonyl and aluminum chloride catalyst in a reaction medium containing a polar solvent. This polymerization was the same as Example 4 except 1.4 grams of KI was added to the bottle along with the $Ni(CO)_4$ and $AlCl_3$, and the polymerization was allowed to continue for 60 hours. Substantially all the butadiene was converted to high molecular weight polybutadiene which had 95% trans-1,4 3% cis-1,4 and 270 1, 2 structure.

In view of the many changes and modifications that may be made without departing from the principles underlying the invention, reference should be made to the appended claims for an understanding of the scope of the protection afforded the invention.

Having thus described by invention what I desire to claim and protect by Letters Patent is:

1. A polymerization catalyst comprising nickel carbonyl and a Friedel-Crafts catalyst.

2. A polymerization catalyst comprising $Ni(CO)_4$ and an acidic metal halide selected from the group consisting of $AlCl_3$, $AlBr_3$, $AlI_3$, $HgCl_2$, $HgBr_2$, $HgI_2$, $TiCl_4$, $ZrCl_4$, $GaCl_3$, $BCl_3$, $BF_3$, $BF_3O(CH_2CH_3)_2$.

3. A polymerization catalyst comprising $Ni(CO)_4$ and $AlCl_3$.

4. A polymerization catalyst comprising $Ni(CO)_4$ and $HgCl_2$.

5. A polymerization catalyst comprising nickel carbonyl and a Friedel-Crafts catalyst, the mole ratio of nickel to Friedel-Crafts catalyst being in the range of 10:1 to 1:10.

6. A polymerizaiton catalyst comprising $Ni(CO)_4$ and an acidic metal halide selected from the group consisting of $AlCl_3$, $AlBr_3$, $AlI_3$, $HgCl_2$, $HgBr_2$, $HgI_2$, $TiCl_4$, $ZrCl_4$, $GaCl_3$, $BCl_3$, $BF_3$, $BF_3O(CH_2CH_3)_2$, the mole ratio of nickel carbonyl to acidic metal halide being in the range of 10:1 to 1:10.

7. A polymerization catalyst comprising $Ni(CO)_4$ and $AlCl_3$ the mole ratio of nickel to aluminum being in the range of 10:1 to 1:10.

8. A polymerization catalyst comprising $Ni(CO)_4$ and $HgCl_2$, the mole ratio of nickel to mercury being in the range of 10:1 to 1:10.

9. A process for producing a polymer of butadiene 1.3 which comprises contacting under polymerizing conditions butadiene with a polymerization catalyst comprising nickel carbonyl and a Friedel-Crafts catalyst.

10. A process for producing a polymer of butadiene-1,3 which comprises contacting under polymerizing conditions butadiene with a polymerizaton catalyst comprising $Ni(CO)_4$ and an acidic metal halide selected from the group consisting of $AlCl_3$, $AlBr_3$, $AlI_3$, $HgCl_2$, $HgBr_2$, $HgI_2$, $TiCl_4$, $ZrCl_4$, $GaCl_3$, $BCl_3$, $BF_3$, $FB_3O(CH_2CH_3)_2$.

11. A process for producing a polymer of butadiene-1,3 which comprises contacting under polymerizing conditions butadiene with a polymerization catalyst comprising $Ni(CO)_4$ and $AlCl_3$.

12. A process for producing a polymer of butadiene-1,3 which comprises contacting under polymerizing conditions butadiene with a polymerization catalyst comprising $Ni(CO)_4$ and $HgCl_2$.

13. A process for producing a polymer of butadiene-1,3 which comprises contacting under polymerizing conditions butadiene-1,3 with an organic solvent, and a polymerization catalyst comprising nickel carbonyl and a Friedel-Crafts catalyst, the mole ratio of nickel to Friedel-Crafts catalyst being in the range of 10:1 to 1:10, the weight ratio of butadiene to organic solvent being in the range of 1:20 to 1:1, and the concentration of catalyst in the reaction mixture being in the range of 0.01 to 10 grams of nickel content per liter.

14. A process for producing a polymer of butadiene-1,3 which comprises contacting under polymerizing conditions butadiene-1,3 with an organic solvent, and a polymerization catalyst comprising $Ni(CO)_4$ and $AlCl_3$, the mole ratio of nickel to aluminum being in the range of 10:1 to 1:10, the weight ratio of butadiene to organic solvent being in the range of 1:20 to 1:1, and the concentration of catalyst in the reaction mixture being in the range of 0.01 to 10 grams of nickel content per liter.

15. A process for producing a polymer of butadiene-1,3 which comprises contacting under polymerizing conditions butadiene-1,3 with an organic solvent and a polymerization catalyst comprising $Ni(CO)_4$ and $HgCl_2$, the mole ratio of nickel to mercury being in the range of 10:1 to 1:10, the weight ratio of butadiene to organic solvent being in the range of 1:20 to 1:1, and the concentration of catalyst in the reaction mixture being in the range of 0.01 to 10 grams of nickel content per liter.

16. A process for producing a high molecular weight polymer of butadiene-1,3 in which a major proportion of the monomer units have cis-1,4 structure which comprises contacting under polymerizing conditions butadiene-1,3 with an organic solvent consisting of non-polar solvent, and a polymerization catalyst comprising nickel carbonyl and an acidic metal halide selected from the group consisting of $AlCl_3$, $AlBr_3$, $AlI_3$, $HgCl_2$, $HgBr_2$, $HgI_2$, $TiCl_4$, $ZrCl_4$, $GaCl_4$, $BCl_3$, $BF_3$, $BF_3O(CH_2CH_3)_2$, the mole ratio of nickel to acidic metal halide being in the range of 10:1 to 1:10, the weight ratio of butadiene to organic solvent being in the range of 1:20 to 1:1, and the concentration of catalyst in the reaction mixture being in the range of 0.01 to 10 grams of nickel content per liter.

17. A process for producing a high molecular weight polymer of butadiene-1,3 in which a major proportion of the monomer units have cis-1,4 structure which comprises contacting under polymerizing conditions butadiene-1,3 with an organic solvent consisting of benzene, and a polymerization catalyst comprising $Ni(CO)_4$ and $AlCl_3$, the mole ratio of nickel to aluminum being in the range of 10:1 to 1:10, the weight ratio of butadiene to organic solvent being in the range of 1:20 to 1:1, and the concentration of catalyst in the reaction mixture being in the range of 0.01 to 10 grams of nickel content per liter.

18. A process for producing a high molecular weight polymer of butadiene-1,3 in which a major proportion of the monomer units have cis-1,4 structure which comprises contacting under polymerizing conditions butadiene-1,3 with an organic solvent consisting of benzene, and a polymerization catalyst comprising $Ni(CO)_4$ and $HgCl_2$, the mole ratio of nickel to mercury being in the range of 10:1 to 1:10, the weight ratio of butadiene to organic solvent being in the range of 1:20 to 1:1, and the concentration of catalyst in the reaction mixture being in the range of 0.01 to 10 grams of nickel content per liter.

19. A process for producing a high molecular weight polymer of butadiene-1,3 in which a major proportion of the monomer units have trans-1,4 structure which comprises contacting under polymerizing conditions butadiene-1,3 with an organic solvent containing at least 10% of an alcohol, and a polymerization catalyst comprising nickel carbonyl and an acidic metal halide selected from the group consisting of $AlCl_3$, $AlBr_3$, $AlI_3$, $HgCl_2$, $HgBr_2$, $HgI_2$, $TiCl_4$, $ZrCl_4$, $GaCl_4$, $BCl_3$, $BF_3$, $BF_3O(CH_2CH_3)_2$, the mole ratio of nickel to acidic metal halide being in the range of 10:1 to 1:10, the weight ratio of butadiene to organic solvent being in the range of 1:20 to 1:1, and the concentration of catalyst in the reaction mixture being in the range of 0.01 to 10 grams of nickel per liter.

20. A process for producing a high molecular weight polymer of butadiene-1,3 in which a major proportion of the monomer units have trans-1,4 structure which comprises contacting under polymerizing conditions butadiene-1,3 with an organic solvent containing at least 10% of polar solvent selected from the group consisting of alkanols having 1 to 8 carbon atoms and cycloalkanols having 5 to 8 carbon atoms, and a polymerization catalyst comprising $Ni(CO)_4$ and $AlCl_3$, the mole ratio of nickel to aluminum being in the range of 10:1 to 1:10, the weight ratio of butadiene to organic solvent being in the range of 1:20 to 1:1, and the concentration of catalyst in the reaction mixture being in the range of 0.01 to 10 grams of nickel content per liter.

References Cited by the Examiner
FOREIGN PATENTS 17,687   10/1962   Japan.

JOSEPH L. SCHOFER, *Primary Examiner.*